(12) United States Patent
Hartstein et al.

(10) Patent No.: US 7,090,076 B2
(45) Date of Patent: Aug. 15, 2006

(54) CELL PHONE/PERSONAL DIGITAL ASSISTANT BUILT INTO HANDBAG

(76) Inventors: Stanley Hartstein, 98 Virginia Ave., Clifton, NJ (US) 07012; Rachel Faye Hartstein, 98 Virginia Ave., Clifton, NJ (US) 07012

( * ) Notice: Subject to any disclaimer, the term of this patent is extended or adjusted under 35 U.S.C. 154(b) by 514 days.

(21) Appl. No.: 10/351,052

(22) Filed: Jan. 27, 2003

(65) Prior Publication Data

US 2004/0144665 A1 Jul. 29, 2004

(51) Int. Cl.
*A45C 3/06* (2006.01)
*A45C 13/26* (2006.01)

(52) U.S. Cl. .............. 206/320; 206/216; 206/569; 150/106; 150/112

(58) Field of Classification Search .............. 206/320, 206/216, 305, 569, 320 OR, 216 X, 569 X; 362/156; 150/112, 106, 107, 112 X, 106 X
See application file for complete search history.

(56) References Cited

U.S. PATENT DOCUMENTS

| | | | | |
|---|---|---|---|---|
| 2,218,396 A | * | 10/1940 | Hallbauer | 362/156 |
| 6,047,752 A | * | 4/2000 | Southwick | 150/117 |
| 6,637,484 B1 | * | 10/2003 | Kraft | 150/112 |
| 6,637,909 B1 | * | 10/2003 | Bryan | 362/156 |
| 6,646,864 B1 | * | 11/2003 | Richardson | 361/681 |
| 2001/0027834 A1 | * | 10/2001 | Southwick | 150/108 |
| 2002/0133659 A1 | * | 9/2002 | Tree et al. | 710/300 |
| 2003/0173242 A1 | * | 9/2003 | Fisher et al. | 206/320 |
| 2004/0035720 A1 | * | 2/2004 | Hsieh | 206/232 |

* cited by examiner

*Primary Examiner*—Mickey Yu
*Assistant Examiner*—Jerrold Johnson
(74) *Attorney, Agent, or Firm*—Siegmar Silber

(57) ABSTRACT

A handbag for housing a cell phone/Personal Digital Assistant (PDA) and containing a compartment for personal items is disclosed. The housing provisions include circuitry between inner lining and outer shell of handbag interconnecting various compartments therewithin, including backup battery compartment and a touch-operated screen (operable from the exterior). The handbag also has modular outlets to physically connect and integrate the cell phone/PDA system and an antenna to facilitate wireless connection.

10 Claims, 4 Drawing Sheets

CELL PHONE/PERSONAL DIGITAL ASSISTANT BUILT INTO HANDBAG

BACKGROUND OF INVENTION

1. Field of the Invention

The present invention relates to the common cell phone/Personal Digital Assistant (PDA) and its accessories that are combined with and are incorporated into a handbag.

2. Background of the Prior Art

Significant advancements have been made for the cell phone with respect to miniaturization. While a less bulky cell phone unit has the advantage of being easier to store and carry, it is not necessarily easier to use. Currently, cell phones as well as PDA's are stored loosely in handbags or in compartments fashioned from the inner lining. The size reduction of the contemporary cell phone results in the difficulty and awkwardness in accessing a ringing phone within a cluttered handbag in a timely fashion. Outside the handbag, the cell phone becomes even harder to locate.

Holding a cell phone while conversing encumbers one hand and distracts the user from performing other tasks. A headphone attachment successfully resolves this drawback as well as the concern radiation but does so at the expense of miniaturization, ease of handling and storability.

SUMMARY OF THE INVENTION

The present invention incorporates the cell phone as well as its accessories as part of the handbag. The handbag thereby stores the cell phone and its accessories in a convenient manner as well as unobtrusively organizes the various components unobtrusively.

OBJECTS AND FEATURES OF THE INVENTION

It is the object of the present invention to provide a convenient means of carrying a cell phone/PDA and related accessories while walking and traveling.

It is another object of the present invention to utilize the space and structure of a handbag to hold a cell phone and integrate it together with its components as well as its accessories.

It is yet another object of the present invention to facilitate the safe and convenient use of a cell phone while walking and traveling.

A fourth object of the present invention is to provide the user with a new style of fashion as well as technology.

The foregoing and other objects of the invention are realized by the present invention by means of electrical circuits, embedded within the structure of the handbag, that connect the various components of the cell phone to each other. These circuits link the handset that is stored in a compartment within the handbag to a touch screen that is part of the exterior of the handbag at a location that the user can comfortably view. A third major component is the speaker headset that is connected to the system by means or wire or wireless transmission by a antenna affixed to the handbag.

Such an arrangement affords the advantages of a miniaturized cell phone in that it utilizes space that is already available. It also provides for the advantages of a larger unit by providing a larger screen, allowing for more functions to be displayed at one time. Other advantages include a larger dialing area, a means for faster locating cell phone and a longer battery life between charging and recharging.

Other features and advantages of the present invention will become apparent from the following description of the invention that refers to the accompanying drawings.

DETAILED DESCRIPTION OF THE PREFERRED EMBODIMENTS

Figure 1:
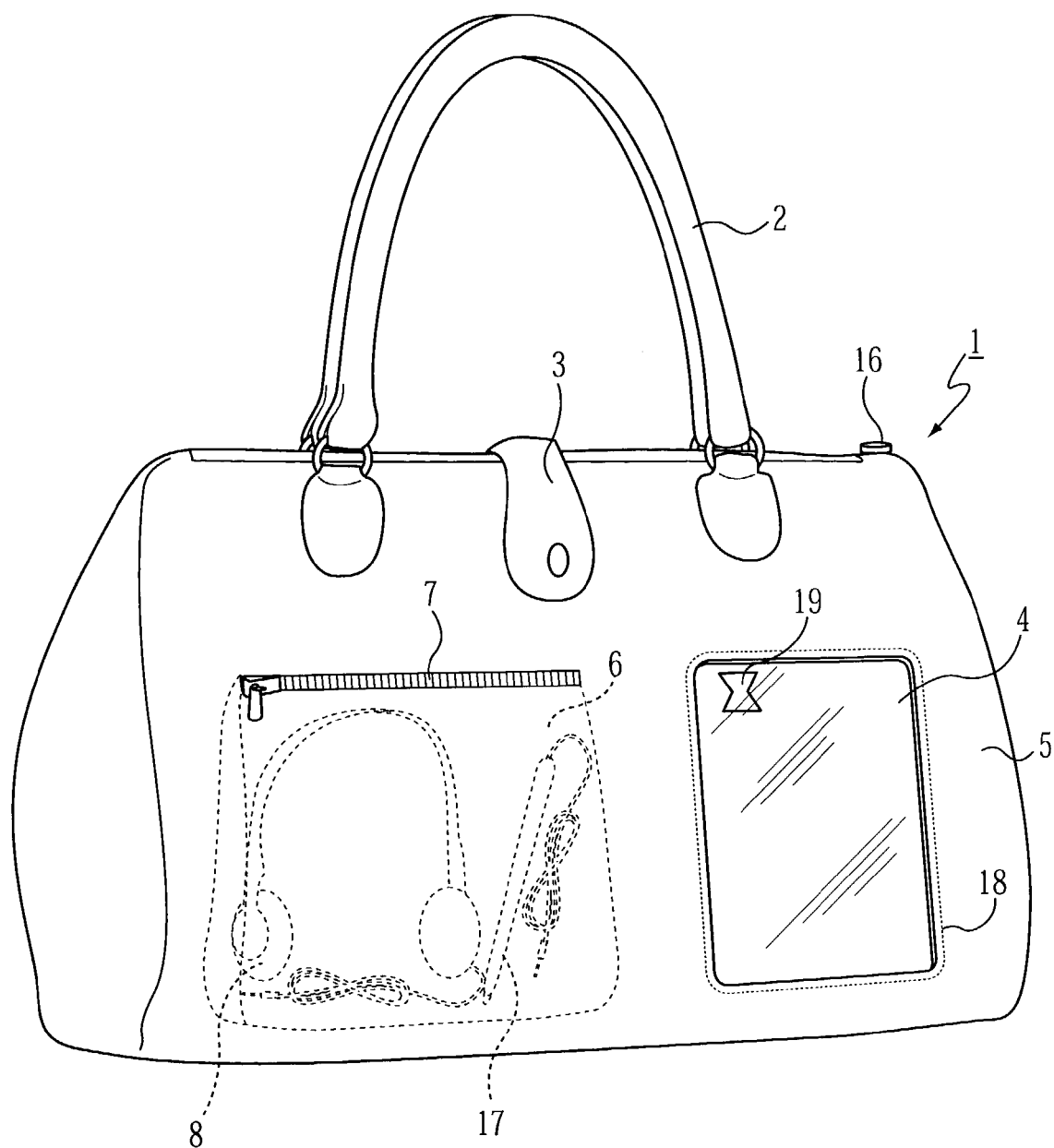
FIG. 1 is a perspective view of the cell phone/personal digital assistant built into a handbag of this invention showing the exterior of the handbag with a touch-operated, display screen affixed to the outer shell thereof, and, in dashed lines, a compartment with a speaker-headset and a stylus therewithin.

Referring now to FIGS. 1 through 5 a perspective view is shown of an otherwise conventional handbag 1 with strap 2 and clasp 3 that allow access to interior compartments. Most visible on the exterior shell of handbag 1 is touch screen display 4 that is either housed in or mounted on exterior shell 5. As seen in the drawing, the touch screen display 4 of PDA 18 is disposed behind an opening or aperture in the handbag shell 5 in a recessed well enabling the operation thereof from outside handbag 1. Touch screen display 4, which is part of Personal Digital Assistant (PDA) device 18, is affixed to the outer shell 5 of the handbag 1 and connected to internal wire grid (not shown) by means of wire (10 in FIG. 4) going into the interior thereof. Icon 19 represents data displayed on PDA screen 4 that enables user to read messages relayed as well as input data and commands.

Compartment 6 has an opening and closing device that in this illustration is zipper 7. Compartment 6 affords user access to speaker-headset 8 as well as stylus 17 used for input of commands. Speaker-headset 8 is plugged into jack outlet (not shown) on the interior of compartment 6.

Figure 2:
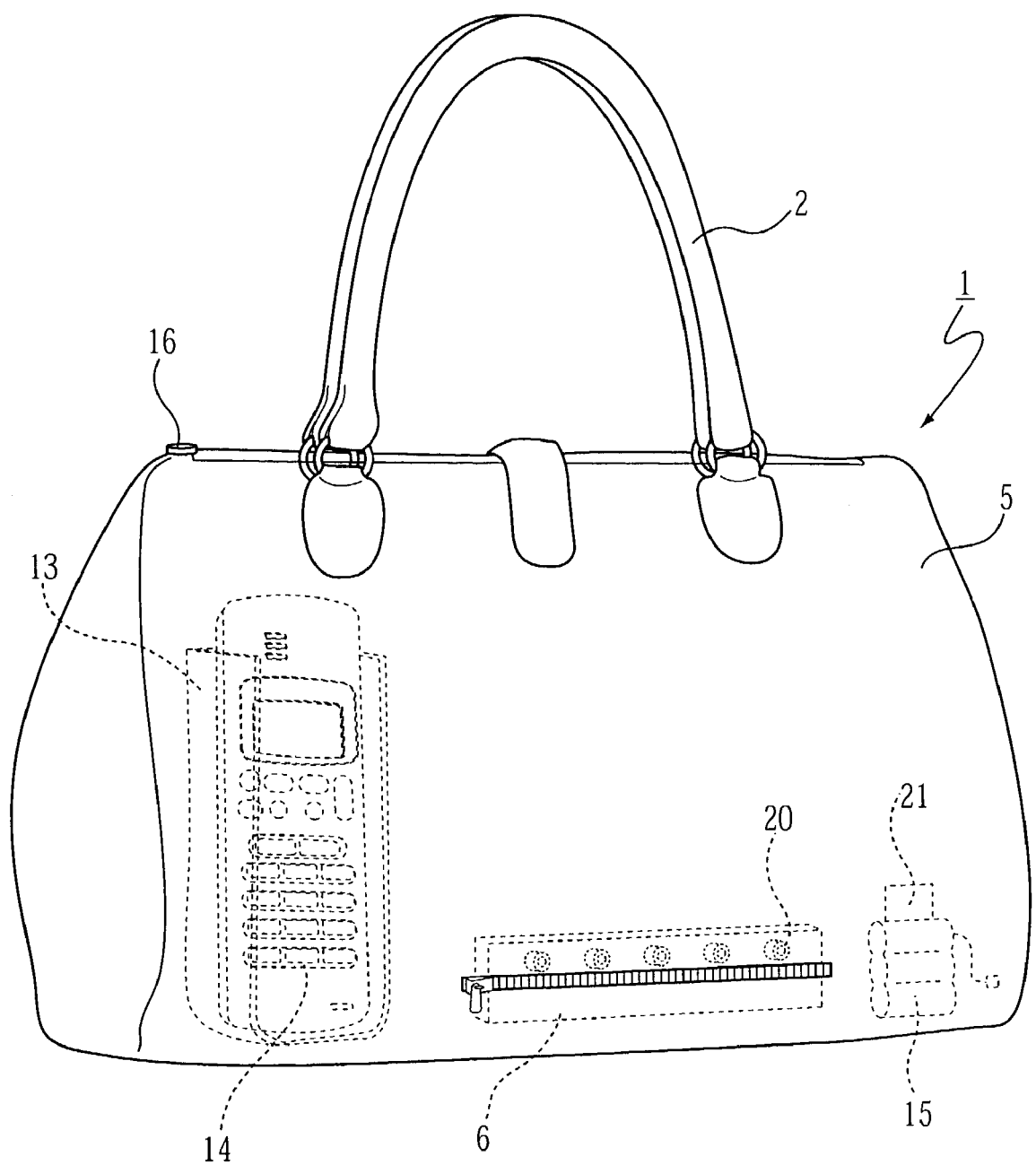
FIG. 2 is a perspective view of the invention of FIG. 1 showing in dashed lines a pouch holding the cell phone unit, a connector strip for accessories, and a backup battery pack.

FIG. 2 shows cell phone components within interior of handbag 1. Pouch 13 inside main compartment of handbag provides a means of securely holding cell phone 14. Cell phone 14 is connected to circuit (not shown) by means of wire (10 in FIG. 4) through jack 20 within modified compartment 6. Battery pack 15 is securely affixed to interior of handbag and connected to circuit grid (10 in FIG. 4) through jack 20. Motion sensitive generator 21 is connected to battery pack.

Figure 3:
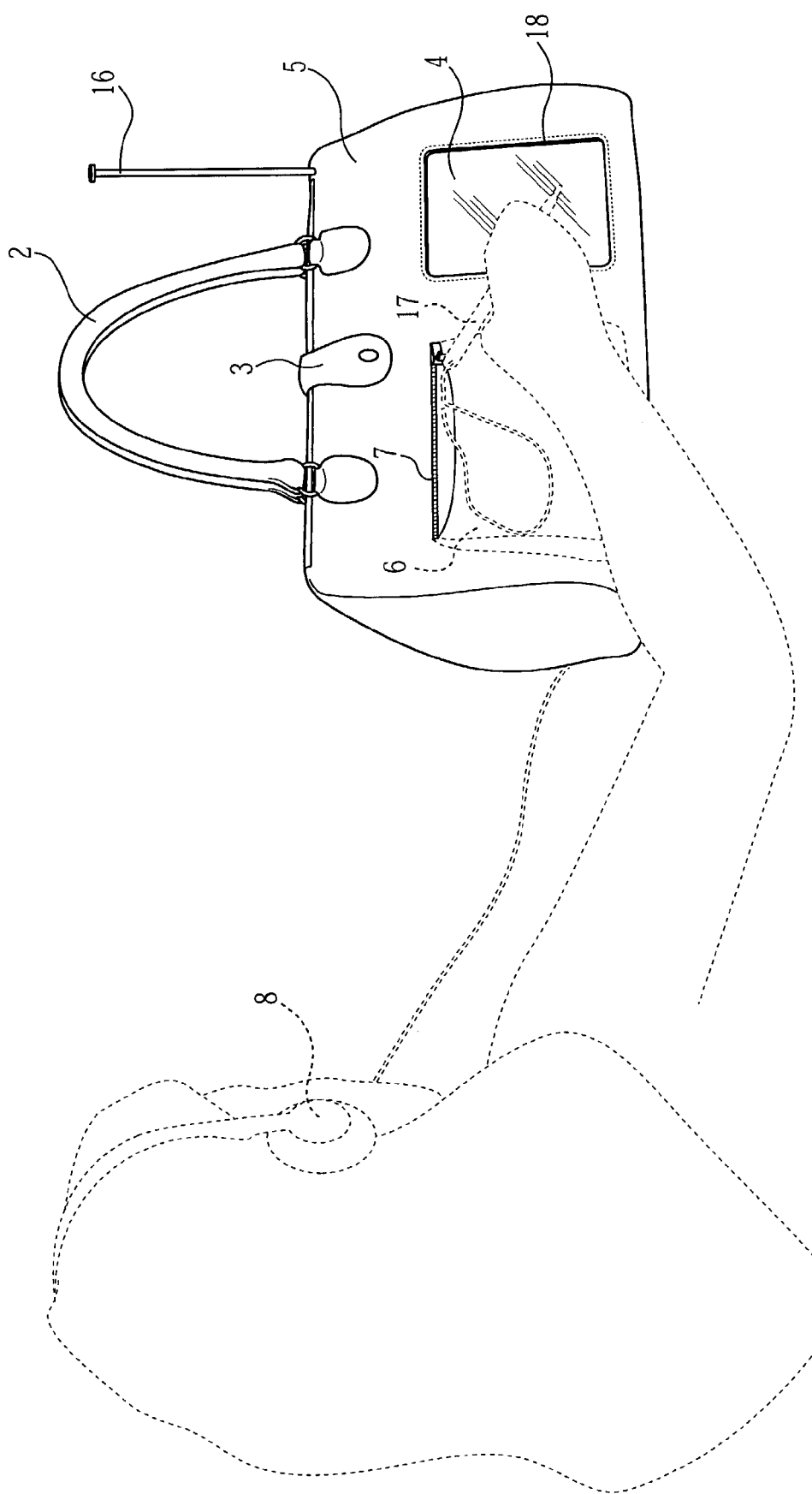
FIG. 3 is a perspective view of the invention of FIG. 1 showing an antenna for aiding wireless communication and, in dashed lines, a user wearing the speaker-headset accessing data through the touch-operated, display screen.

FIG. 3 shows user utilizing contents of compartment 6. Antenna 16 transmits conversation between cell phone and speaker-headphone 8. FIG. 3 further shows stylus 17 in user's right hand that she uses to issue commands via icons on screen 4 in order to utilize various features of PDA 18.

In the course of operation of present invention, user hears an audible indication of incoming call from cell phone 14 or PDA 18 and proceeds to look at display screen 4 to see phone number of incoming call displayed. She then opens zipper 7 and removes speaker headphone 8 that receives transmissions via antenna 16. She proceeds by tapping icon 19 on screen 4 to accept call. At the end of call, user taps icon on screen 4 that corresponds to end of call command. To initiate an outgoing call, user will remove speaker-headphone 8 from its compartment and issue a voice command or will access directory in PDA 18 by means of stylus 17.

Figures 4, 5:
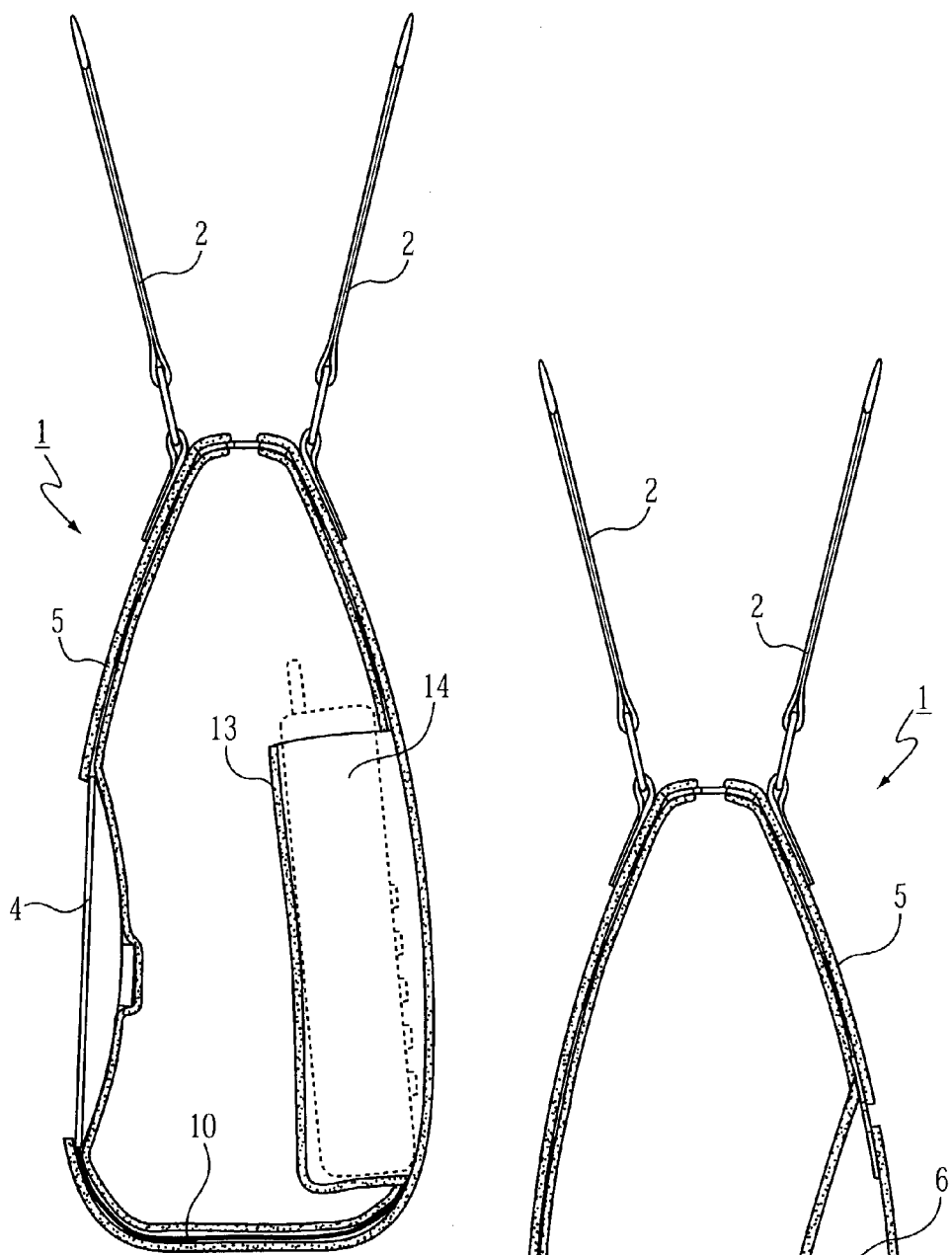
FIG. 4 is a cross-sectional view of the invention of FIG. 1 showing the interconnection of system components with the touch-operated, display screen; and, FIG. 5 is a cross-sectional view of the invention of FIG. 1 showing the interconnection of system components with the equipment compartment and the backup battery pack.

FIG. 4 is a cross-sectional view of two of the several applicable components namely, cell phone 14 connected to PDA 18 and screen 4 by means of circuit grid represented by wire 10 that is layered between outer shell 5 of handbag and inner lining.

FIG. 5 likewise is a view of invention illustrating wire 10 physically connecting compartment 6 to battery pack 15 and generator 21.

What is claimed is:

1. A handbag and cell phone/PDA system comprising, in combination:
    a handbag shell having an interior surface and an exterior surface;
    an inner lining adjacent to and attached to said interior surface of said handbag shell, said inner lining having an interior surface and an exterior surface;
    an aperture in said handbag shell providing access therethrough;
    a PDA support disposed adjacent said aperture between said exterior surface of said inner lining and said interior surface of said handbag shell, said PDA support dimensioned to house a PDA;
    a PDA disposed in said PDA support and positioned to permit operation thereof through said aperture; and,
    an electrical circuit between said exterior surface of said inner lining and said interior surface of said handbag shell for interconnection with said cell phone/PDA system.

2. The handbag and cell phone/PDA as described in claim 1, further comprising a plurality of modular outlets to connect and integrate therewithin electrical components.

3. The handbag and cell phone/PDA as described in claim 1, further comprising a plurality of modular outlets to connect and integrate a system having said PDA and a cell phone.

4. The handbag and cell phone/PDA as described in claim 1, further comprising modular outlets to connect and integrate said cell phone/PDA system and accessories therefor.

5. The handbag and cell phone/PDA as described in claim 4, further comprising a cell phone removably connected to one of said modular outlets of said electrical circuit disposed within said handbag.

6. A handbag for a cell phone/PDA system comprising, in combination:
    a handbag shell having an interior surface and an exterior surface;
    an inner lining adjacent to and attached to said interior surface of said handbag shell, said inner lining having an interior surface and an exterior surface;
    an aperture in said shell providing access therethrough;
    a PDA support disposed adjacent said aperture between said exterior surface of said inner lining and said interior surface of said handbag shell, said PDA support dimensioned and adapted to house a PDA, said handbag, upon disposition of a PDA in said PDA support, adapted to permit operation of said PDA through said aperture; and,
    an electrical circuit between said exterior surface of said inner lining and said interior surface of said handbag shell adapted to interconnect said cell phone/PDA system.

7. A handbag as described in claim 6 further comprising a plurality of modular outlets adapted to connect and integrate therewithin electrical components.

8. A handbag as described in claim 6 further comprising a plurality of modular outlets to enable connect and integrate a system having said PDA and a cell phone.

9. A handbag as described in claim 6 further comprising modular outlets adapted adapted to connect and integrate said cell phone/PDA system and accessories therefor.

10. A handbag as described in claim 9 further wherein one of said modular outlets of said electrical circuit disposed within said handbag is adapted for removable connection to a cell phone.

* * * * *